United States Patent [19]
Ikeuchi

[11] Patent Number: 4,885,509
[45] Date of Patent: Dec. 5, 1989

[54] HIGH VOLTAGE GENERATING APPARATUS FOR SUPPLYING HIGH VOLTAGE TO CATHODE RAY TUBE

[75] Inventor: Hiroshi Ikeuchi, Yokosuka, Japan

[73] Assignee: Murata Manufacturing Company, Nagaokakyo, Japan

[21] Appl. No.: 188,578

[22] Filed: Apr. 29, 1988

[30] Foreign Application Priority Data

| Apr. 30, 1987 | [JP] | Japan | 62-107288 |
| Jul. 9, 1987 | [JP] | Japan | 62-171863 |
| Nov. 11, 1987 | [JP] | Japan | 62-285056 |

[51] Int. Cl.$^4$ ............... H01J 29/70; H04N 5/63; H04N 5/68
[52] U.S. Cl. ................... 315/411; 358/190; 358/243
[58] Field of Search ............... 315/411; 358/190, 242, 358/243

[56] References Cited

U.S. PATENT DOCUMENTS 4,090,111  5/1978  Suzuki ........................... 315/411
4,213,166  7/1980  Watanabe ..................... 315/411

Primary Examiner—Thomas H. Tarcza
Assistant Examiner—Gregory C. Issing
Attorney, Agent, or Firm—Armstrong, Nikaido, Marmelstein, Kubovcik & Murray

[57] ABSTRACT

A high voltage generating apparatus for supplying a high voltage to a cathode-ray tube is provided with a flyback transformer which has a low voltage coil and a high voltage coil.

A first circuit detects a quantity of current which flows in the low voltage coil, and a second circuit detects a quantity of current which flows in the high voltage coil. A thyristor turns on when the quantity of current of the first circuit becomes larger than that of the second circuit to fusing-disconnect a fuse connected to a power supplying circuit, thus stopping the operation of the flyback transformer.

14 Claims, 6 Drawing Sheets

HIGH VOLTAGE GENERATING APPARATUS FOR SUPPLYING HIGH VOLTAGE TO CATHODE RAY TUBE

FIELD OF THE INVENTION

The present invention relates to a high voltage generating apparatus to be used in television equipment, particularly a high voltage generating apparatus provided with a circuit for preventing a fire or similar problem caused by shorting of the winding of the high voltage coil of the flyback transformer.

BACKGROUND OF THE INVENTION

Referring to FIG. 1, there is shown a common basic circuit of the high voltage generating apparatus used in television receiving units and general display units respectively using a cathode-ray tube.

This basic circuit has the horizontal output circuit 1 and the high voltage circuit 2. The horizontal output circuit 1 comprises the horizontal output transistor 3, damper diode 4, resonance capacitor 5, horizontal deflection coil 6 and the S-shaped compensation capacitor 7. The horizontal output transistor 3 performs switching operation with a voltage pulse transmitted from the horizontal drive circuit not shown. In this case, the current which flows through the transistor 3 becomes a sawtoothed waveform current in the horizontal deflection coil 6 in response to the function of the damper diode 4.

On the other hand, the resonance circuit comprising the resonance capacitor 5 and the horizontal deflection coil 6 generates a flyback pulse by its resonating action and supplies it to the high voltage circuit 2.

The high voltage circuit 2 comprises the flyback transformer 8 and the high voltage rectifying diode 10. One end terminal of the low voltage coil (primary coil) 12 of the flyback transformer 8 is connected to the collector of transistor 3 and the other end terminal of the low voltage coil 12 is connected to the input power supply 13. Meanwhile, the high voltage side terminal of the high voltage coil (secondary coil) 14 of the flyback transformer 8 is connected to the anode 16 of cathode-ray tube 15 through the high voltage rectifier diode 10 and the low voltage side terminal is connected to the ABL (Automatic Brightness Limiter) circuit. In such a configuration, the high voltage circuit 2 boosts a flyback pulse supplied from the horizontal output circuit 1 through the flyback transformer 8, rectifies it by the high voltage rectifying diode 10 and supplies the rectified output $E_H$ to the anode 16.

In case of the high voltage generating apparatus configured as described above, however, the effective output is as large as several tens of watts with a possibility of an accident or a problem resulting from excessive heat generation, burning, etc. if the apparatus is not appropriately designed and manufactured.

The causes of such an accident or problem in design can be enumerated, such as abnormal heat generation of the core 11 and the high voltage coil 14 of the flyback transformer 8 and withstanding voltage failure between coils 12 and 14 and between the layers of the coil. Also problems arise in the manufacturing stage such as shorting of the winding due to miswinding of coils 12 and 14 and internal discharging due to a mistake in insulation of coils 12 and 14.

Although the design and manufacture of the high voltage generating apparatus are controlled so that no error will occur, complete elimination of errors is difficult even with the best care. Therefore, for example, one measure of prevention which can be considered is that a thermal fuse, connected in series to the low voltage coil 12 or the input power supply 13, is provided in the flyback transformer 8 to avoid a fire or accident by melting the fuse with an abnormally high heat when the flyback transformer generates an abnormally high heat and by preventing application of the voltage to the flyback transformer 8.

However, such a problem takes place as discharging occurs between the thermal fuse, if provided, and the high voltage coil 14 when the thermal fuse is arranged near the coil 14. Insulation to avoid such discharge is extremely difficult since there is an extremely large potential difference between the thermal fuse and the coil 14. To prevent a discharge, it is also considered that the thermal fuse should be arranged away from the high voltage coil 14. If it is so arranged, a disadvantage takes place since abnormal heat due to shorting of the winding of the high voltage coil 14 is not smoothly conducted to the thermal fuse, a safety action (fusing of the thermal fuse) is delayed and therefore a fire or the like cannot be prevented. The driving frequency of the flyback transformer 8 generally ranges from 15.75 kHz to 130 kHz and the electromagnetic coupling effect of the low voltage coil 12 and the high voltage coil 14 should be strengthened. If a large profiled member such as the thermal fuse is provided inside the flyback transformer (for example, between both coils 12 and 14), the electromagnetic coupling effect deteriorates to worsen the basic performance of the flyback transformer 8.

The present invention is intended to solve these problems of the conventional apparatus and to provide the high voltage generating apparatus which provides a device capable of quickly and certainly detecting an abnormality due to shorting of the winding of the flyback transformer and preventing a problem or accident such as fire or burning and rarely adversely affects the basic performance of the flyback transformer with provision of this device.

SUMMARY OF THE INVENTION

The main features of the high voltage generating apparatus in accordance with the present invention is as described below.

The primary side current detection circuit detects a primary current which flows through the low voltage coil of the flyback transformer, comprising the low voltage coil and the high voltage coil, and the high voltage output current which flows through the high voltage coil in a secondary side current detection circuit. In addition, a gate circuit compares the voltage values corresponding to the quantity of a primary current and the quantity of a high voltage output current which are detected in both detection circuits. The gate circuit operates when the absolute value of voltage, corresponding to the quantity of primary current, becomes larger than the absolute value of voltage, corresponding to the quantity of high voltage output current, to fuse the thermal fuse provided in the high voltage, coil output circuit or in the horizontal drive circuit. The power to be supplied to the horizontal deflection output circuit or the horizontal drive circuit is shut off to prevent a fire or accident due to overheat generation of the flyback transformer.

DETAILED DESCRIPTION OF THE INVENTION

Figure 3:
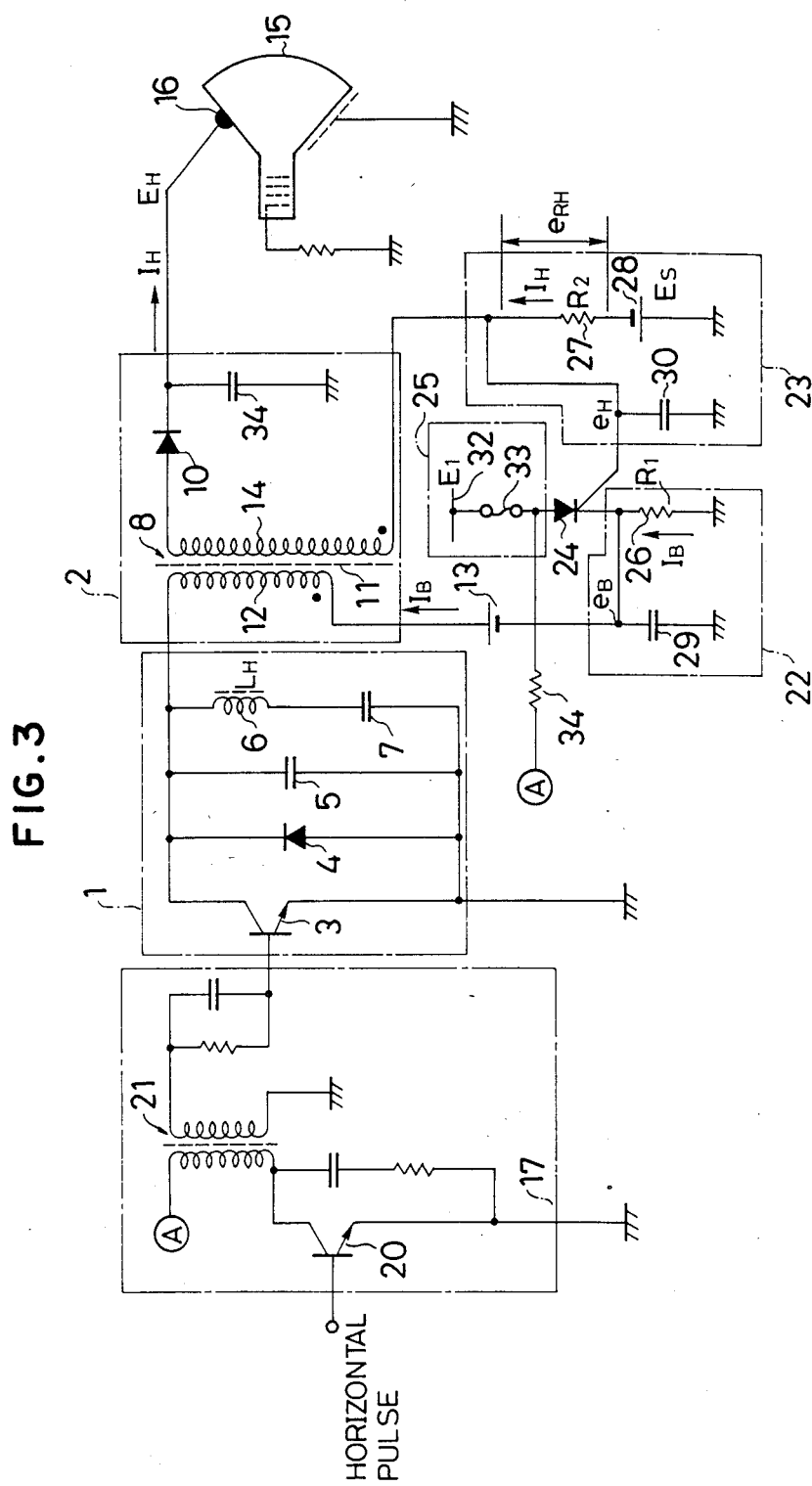
FIG. 3 is a circuit diagram of the high voltage generating apparatus in accordance with the present invention.

Referring to FIG. 3, there is shown a circuit of the high voltage generating apparatus which is an embodiment of the present invention. In the figure, the high voltage generating apparatus comprises the horizontal oscillation circuit (not shown), horizontal drive circuit 17, horizontal output circuit 1, high voltage circuit and abnormality detecting and processing circuit.

The horizontal drive circuit 17 has the drive transistor 20 and the drive transformer 21 and amplifies the horizontal pulse sent from the horizontal oscillation circuit and supplies the voltage pulse, which is waveform-shaped, into the horizontal output circuit 1.

The horizontal output circuit 1 supplies a sawtoothed waveform current to the horizontal deflection coil 6, generates a flyback pulse and supplies this flyback pulse to the high voltage circuit 2.

The high voltage circuit 2 comprises the flyback transformer 8, high voltage rectifier diode 10 and capacitor 34. This circuit increases the voltage of the flyback pulse supplied from the horizontal output circuit 1 through the flyback transformer 8, rectifies it through the high voltage rectifier diode 10 and supplies the rectified output to the anode 16.

The abnormality detecting and processing circuit is intended to certainly detect an abnormality such as shorting of the winding which occurs in the high voltage coil 14 of the flyback transformer 8 and a characteristic circuit of an embodiment in accordance with the present invention. This circuit comprises the primary side current detection circuit 22, secondary side current detection circuit 23, gate circuit 24 and fuse circuit 25.

The primary side current detection circuit 22 comprises the AC path capacitor 29 which eliminates the AC component of current $I_B$ which flows through the low voltage coil 12 and the first detection resistor 26 which detects the DC component of current $I_B$ from which the AC component has been removed. One end of the AC path capacitor 29 is connected to the negative side of the input power supply 13 and one end of the first detection resistor 26 and other ends of capacitor 29 and the first detection resistor 26 are respectively connected to the reference potentials (the grounding side in the figures).

The secondary side current detection circuit 23 comprises the second detection resistor 27 which detects high voltage current $I_H$ the high voltage coil 14, bias power supply r 30 which suppresses noises and smooths the voltage. One end of the second detection resistor 27 one end of the high voltage coil 14 and one end of the capacitor 30. The other end of the detection resistor 27 is connected to the negative side of the bias power supply 28. The positive side of power supply 28 and the other end of the capacitor 30 are respectively connected to reference potentials (the grounding side in the figures).

On the other hand, the gate circuit 24 in this embodiment comprises the thyristor 24. The cathode side of thyristor 24 is connected to the output terminal of primary side current detection circuit 22, that is, the common terminal of one end of the AC path capacitor 29 and one end of the first detection resistor 26. The gate side of thyristor 24 is connected to the output terminal of the secondary side current detection circuit 23, that is, the common terminal of one end of the secondary detection resistor 27 and one end of the capacitor 30, and the anode side of thyristor 24 is connected to the fuse circuit 25. This fuse circuit 25 comprises the DC power supply line 32 and the fuse 33. The anode of the thyristor 24 is connected to the DC power supply 32 through the fuse 33 and to the terminal A of the primary side coil of drive transformer 21 through the resistor 34.

Figure 2:
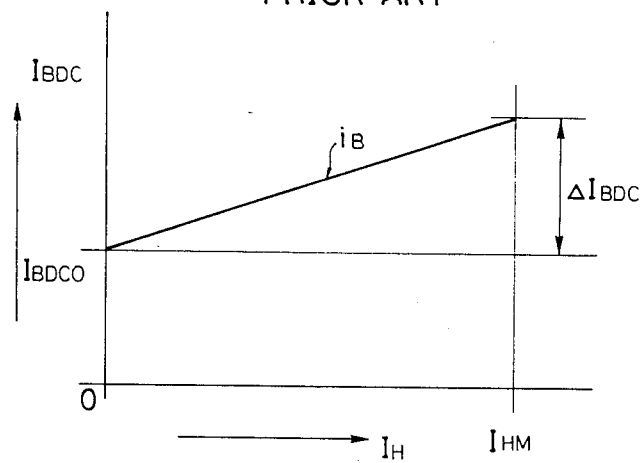
FIG. 2 is a characteristic diagram showing the relationship of a direct current which flows through the low voltage coil of the flyback transformer and a high voltage current which flows through the high voltage coil.

In this embodiment which is configured as described above, high voltage output current $I_H$ applied to the anode 16 of the cathode-ray tube 15 increases with the brightness of the cathode-ray tube 15 during operation of the circuit, while current $I_B$ which flows from the input power supply 13 to the low voltage coil 12 also increases if the high voltage output current $I_H$ increases. This current $I_B$ includes AC and DC components and the relationship of current $I_{BDC}$ of this DC component and high voltage output current $I_H$ is shown in FIG. 2. According to FIG. 2, current $I_{BDC}$ has the sum value of regular DC component $I_{BDCO}$ plus varying DC component $i_B$ which increases in proportion to an increase of high voltage output current $I_H$ and, when $I_H$ varies from 0 to the maximum value $I_{HM}$ in the range of operation, $I_{BDC}$ varies as much as $\Delta I_{BDC}$. This actual current $I_{BDC}$ includes a large sawtoothed waveform component and $I_{DBC}$ is denoted by the mean current value in FIG. 2.

As described above, current $I_B$ flows in the low voltage coil 12 and high voltage current $I_H$ flows in the high voltage coil 14. Direct current component $I_{BDC}$ of current $I_B$ which flows in the low voltage coil 12 is detected by the primary side current detection circuit 22 as described below. In other words, the AC component of current $I_B$ is removed by the AC path capacitor 29 and consequently the voltage which is completely smoothed and proportional to $I_{BDC}$ is charged in the AC path capacitor 29. In short, the voltage having the value of the product of current $I_{BDC}$ of DC component and resistance value $R_1$ of the first detection resistor 26, that is, $e_B = R_1 \times I_{BDC}$ appears across both ends of resistor 26, and current $I_{BDC}$ of DC component is converted to voltage value $e_B$ and detected. This detected value $e_B$ is applied to the cathode of the thyristor 24 from the common terminal of the primary side current detection circuit 22.

Meanwhile, high voltage current $I_H$ flowing through the high voltage side coil 14 is detected as described below by the secondary side current detection circuit 23. In other words, if the resistance value of the second detection resistor 27 is $R_2$ when high voltage current $I_H$ flows in the high voltage coil 14 through the second detection resistor 27, a ripple-free DC voltage of $e_{RH} = I_H \times R_2$ appears across both ends of the resistor 27 and accordingly DC voltage $e_H$ corresponding to said $e_{RH}$ is charged in the capacitor 30. This means that high voltage current $I_H$ is converted to voltage $e_H$ and detected and this detected value $e_H$ is applied from the common terminal of the secondary side current detection circuit 23 to the gate of thyristor 24.

The thyristor 24 turns on the gate to supply the fusing current from the DC power supply 32 to the fuse 33 when the absolute value of the voltage satisfies $|e_H| < |e_B|$. To ensure fusion of the fuse 33 with this fusing current, the fusing current is set so that value $E_1/R_1$ ($E_1$ is the voltage of the DC power supply line 32) is larger than the current necessary for fusing the fuse 33.

In this embodiment, the apparatus maintains the condition represented by $|e_H| \geq |e_B|$ and prevents the gate of thyristor 24 from being turned on as far as the apparatus normally operates (no abnormality is found with the flyback transformer 8). The bias power supply 28 is provided in the secondary side current detection circuit 23 to balance the values of detection currents of both detection circuits 22 and 23.

In other words, negative DC component $I_{BDC}$ flowing through the low voltage coil 12 is the sum of regular component $I_{DBCO}$ and varying component $i_B$ as described and therefore a negative voltage corresponding to component $I_{BDCO}$ is applied from the bias power supply 28 to the second detection resistor 27. Consequently, the balancing relationship of values $e_B$ and $e_H$ can be replaced with the relation of the increased DC component $i_B$ flowing through the low voltage coil 12 to high voltage current $I_H$ flowing through the high voltage coil 14. Accordingly, in the circuit of this embodiment, the turn-on voltage of thyristor 24 is determined in accordance with resistance values $R_1$ and $R_2$ of detection resistors 26 and 27 and voltage Es of the bias power supply 28.

The process of determination of $R_1$, $R_2$ and Es is expressed by the equation as shown below.

DC component $I_{BDC}$ which flows through the low voltage coil is expressed as shown below.

$$I_{BDC} = AI_H + I_{BDCO} \quad (1)$$

(A is a constant.)
$e_H$ and $e_B$ are also expressed as shown below.

$$-e_H = I_H \times R_2 + Es \quad (2)$$

$$-e_B = I_{BDC} \times R_1 \quad (3)$$

If equation (1) is substituted for equation (3), $$-e_B = A \times I_H \times R_1 + I_{BDCO} \times R_1$$

$e_B = e_H$ can be given for normal operation, and therefore, $$I_H \times R_2 + Es = A \times I_H \times R_1 + I_{BDCO} \times R_1$$

accordingly, $I_H \times R_2 = A \times I_H \times R_1$
∴ $R_2 = A \times R_1$
$Es = I_{BDCO} \times R_1$ From the above, it is known that $R_1$, $R_2$ and Es are the circuit constants to be determined. If Es is determined in advance, $R_1$ and $R_2$ are obtained as $R_1 = Es/I_{BDCO}$ $R_2 = A \times Es/I_{BDCO}$ In this embodiment, if value Es with an allowance is determined, the thyristor 24 always maintains the off state and the thyristor 24 will not be turned on in normal operation.

Contrary to this, if an abnormality such as shorting of the winding or the like takes place at the high voltage coil 14 of the flyback transformer 8, the varying component $i_B$ of the current flowing through the low voltage coil 12 suddenly increases and, in case of an abnormality where the flyback transformer 8 will be fired, increment $i_B$ becomes nearly two times $\Delta I_{BDC}$ shown in FIG. 2. As a result of this, the absolute value $|e_H|$ of detection voltage corresponding to the quantity of current to be detected in the primary side current detection circuit 22 is larger than detection voltage value $|e_H|$ corresponding to the quantity of reference current to be detected in the secondary side current detection circuit 23, the thyristor 24 turns on with a sufficient duration of time before the firing is caused. The fusing current determined by $E_1/R_1$ flows in the fuse 33 when the thyristor 24 turns on and the fuse is immediately blown. With this fusion of fuse 33, the voltage applied to the drive transformer 21 is turned off, the operation of flyback transformer 8 is stopped and firing or similar trouble caused by shorting of the winding of the flyback transformer 8 is prevented.

Figure 4:
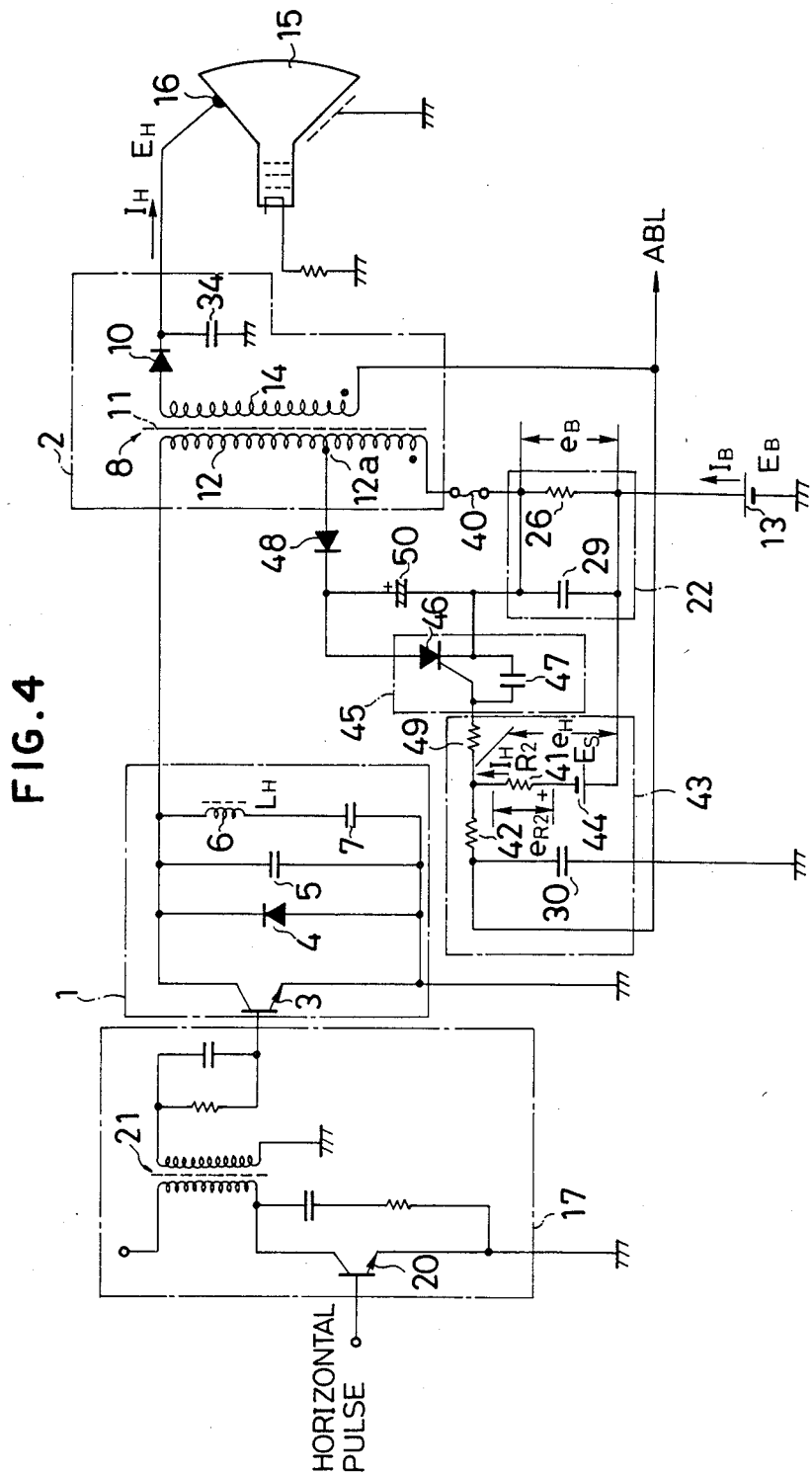
FIGS. 4 to 6 are respectively a circuit diagram showing another embodiment of the apparatus in accordance with the present invention.

Referring to FIG. 4, there is shown another embodiment of the present invention. The following describes the points differing from the circuit shown in FIG. 3. The ABL circuit is connected to the connecting point of the low voltage side end of the high voltage coil 14 and the capacitor 30. The fuse 40 is connected between one end of the low voltage coil 12 and the primary side current detection circuit 22. The secondary side current detection circuit 43 comprises the second detection resistor 41 for detecting the high voltage current $I_H$, bias power supply 44, AC path capacitor 30 and resistor 42. One end of detection resistor 41 is connected to the low voltage side terminal of the high voltage coil 14 through the resistor 42 and the other end is connected to the negative side of power supply 44. The positive side of power supply 44 is connected to the positive side of input power supply 13.

The gate circuit 45 comprises the thyristor 46 and the capacitor 47 for eliminating noises. The anode of thyristor 46 is connected to the intermediate tap 12a of the low voltage coil 12 through the diode 48. The cathode of thyristor 46 is connected to the connecting point of the resistor 26 and the fuse 40. The gate of thyristor 46 is connected to the connecting point of resistors 41 and 42 through the protective resistor 49. Capacitor 47 is connected between the cathode and the gate of thyristor 46 and the smoothing capacitor 50 is connected between the anode and the cathode of thyristor 46.

In the circuit shown in FIG. 4, if high voltage output current $I_H$ flows in the resistor 41, the fall of voltage $C_{R2}$ will be $e_{R2} = I_H \times R_2$. Accordingly, the operation of thyristor 46 is the same as shown in FIG. 3. For example, if the winding of the high voltage coil 14 is shorted, the varying component $i_B$ of the current flowing through the low voltage coil 12 suddenly increases, the absolute value $|e_B|$ of the detection voltage is larger than the absolute value $|e_H|$ of the gate voltage, and the thyristor 46 turns on.

When the thyristor 46 admits the current, both ends of the series circuit from the intermediate tap 12a of the low voltage coil 12 to the fuse 40 is short-circuited. Therefore an extremely large induction current of flyback pulse flows in the shorted circuit and the fuse 40 is instantaneously blown.

The position where the intermediate tap 12a is provided is to be determined in accordance with the rated voltage for the thyristor 46 to avoid application of an excessively large current to the thyristor 46. In some cases, the resistor 49 and the capacitor 50 can be omitted.

Figure 5:
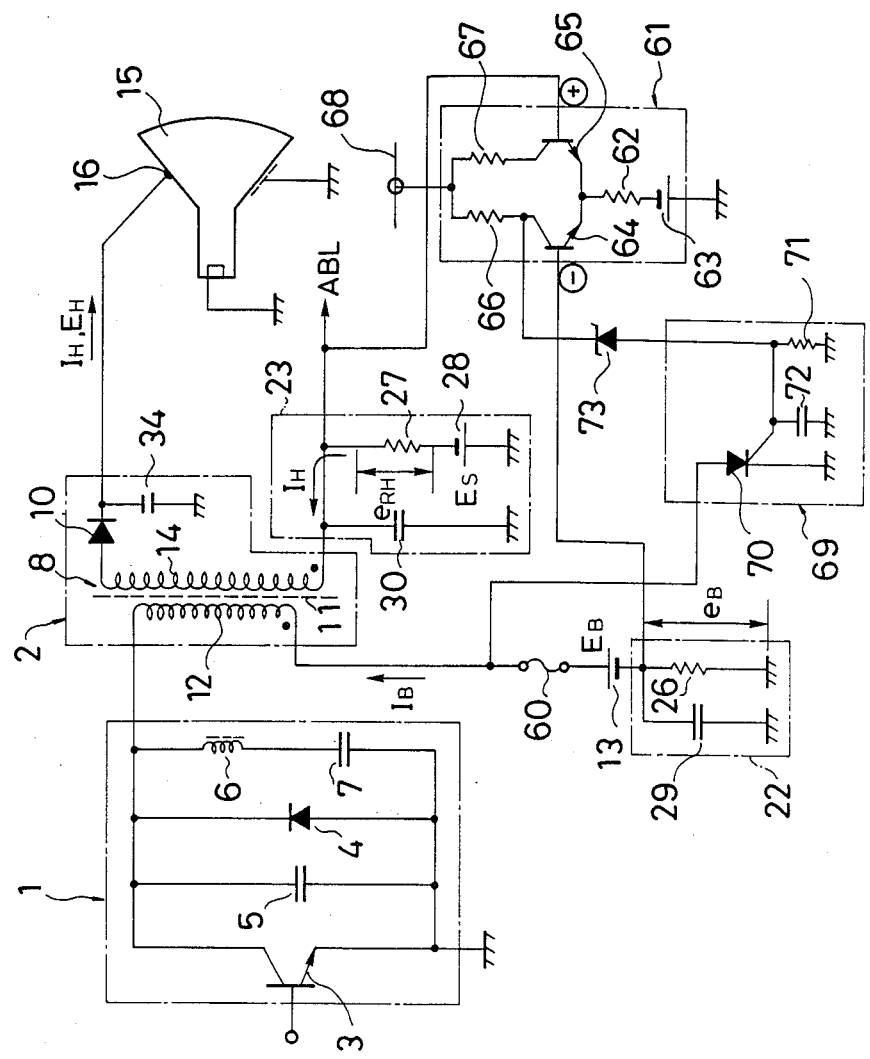

FIG. 5 shows another further embodiment of the present invention. The same parts as the circuit shown in FIG. 3 are given the same symbols. The fuse 60 is connected between the power supply 13 and the low voltage coil 12. The differential amplifier circuit 61 is provided with transistors 64 and 65 the emitters of which are connected to the negative power supply 63 through the common resistor 62. The collectors of these transistors are connected to the positive DC power supply 68 through the collector resistors 66 and 67. The base of transistor 65 is connected to the connecting point of the resistor 27 and the high voltage coil 14 of the secondary side current detection circuit 23, while the base of transistor 64 is connected to the resistor 26 and the power supply 13 of the primary side current detection circuit 22. The gate circuit 69 comprises the thyristor 70, voltage dividing resistor 71 and noise suppressing capacitor 72. The anode of thyristor 70 is connected between the fuse 60 and the low voltage coil 12 and its cathode is grounded. The gate of thyristor 70 is connected to the collector of the transistor 64 through the Zener diode 73 and grounded through the parallel circuit comprising the resistor 71 and the capacitor 72.

Voltage $e_B$ of the primary side current detection circuit 22 is supplied to the base of transistor 64 and voltage $e_H$ of the secondary side current detection circuit 23 is applied to the base of transistor 65. When the high voltage generating apparatus normally operates, the transistor 65 is in the off-state and the transistor 64 is in the on-state. Accordingly, the gate voltage of thyristor 70 is fully low and the thyristor 70 commutates.

If the winding in the high voltage coil 14 is shorted under the above condition of balance, primary side current IB suddenly increases and the negative voltage across the resistor 26 largely increases. With this voltage variation, the transistor 64 is in the OFF state and the transistor 65 is in the ON state. The collector voltage of the transistor 64 is supplied to the gate of thyristor 70 through the Zener diode 73 and the thyristor 70 turns on. Thus an overcurrent flows in the fuse 60 and the fuse will be blown.

The Zener diode 72 is provided to prevent the thyristor 70 from turning on when the collector voltage of the transistor 64 varies within the range of Zener voltage thereby the primary current $I_B$ varies within the allowable range.

Figure 6:
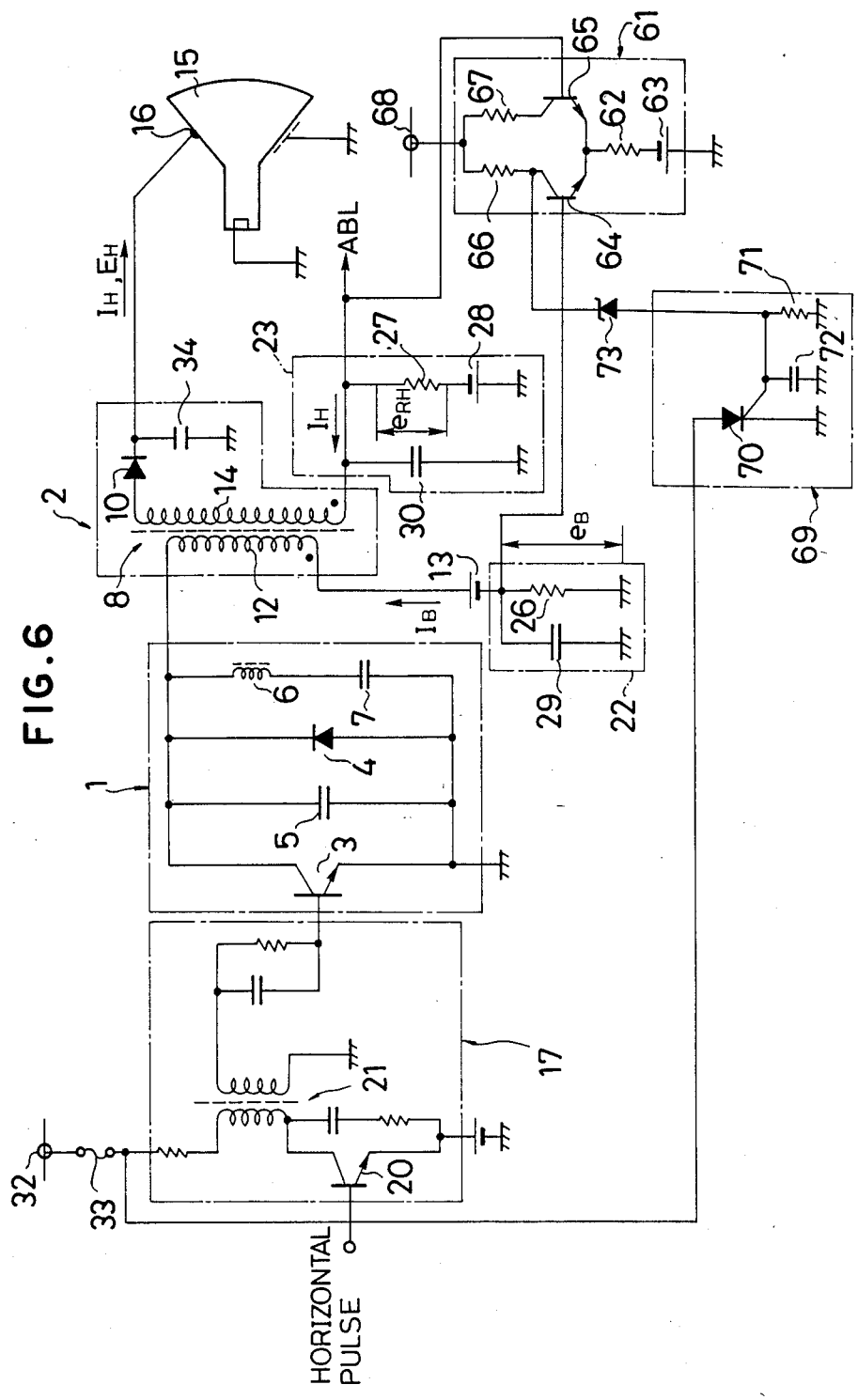

FIG. 6 shows another further embodiment of the present invention. The same parts as the circuits shown in FIGS. 3 and 5 are given the same symbols. The circuit shown in FIG. 6 is made up by adding the differential amplifier circuit 61 and the gate circuit 67 shown in FIG. 5 to the circuit shown in FIG. 3. Operation of the differential amplifier circuit 61 is the same as in FIG. 5. When the thyristor 70 turns on, the power supplied to the horizontal drive circuit 17 is shut off and the operation of the horizontal drive circuit 17 is stopped whereby the operation of the horizontal output circuit 1 is stopped.

Figure 1:
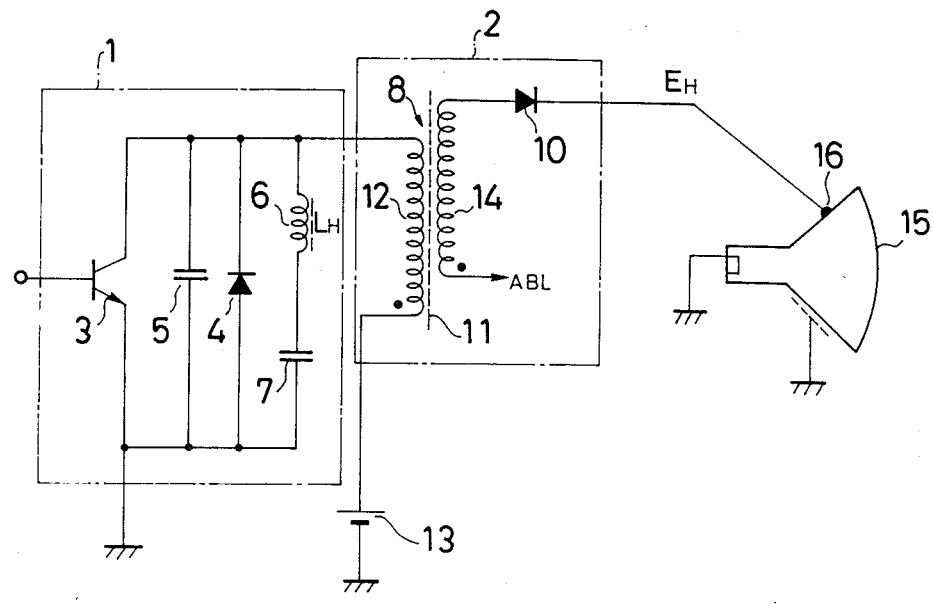
FIG. 1 is a circuit diagram of a conventional high voltage generating apparatus.
Figure 7:
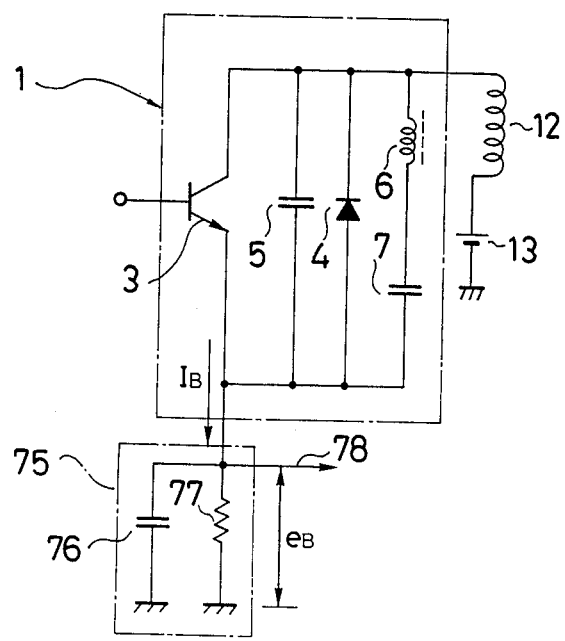
FIG. 7 is an embodiment showing another position where the primary side current detection circuit is provided.

FIG. 7 is a variation example of the setting position of the primary side current detection circuit. The primary side current detection circuit 75 can be provided between the emitter of the horizontal output transistor 3 of the horizontal output circuit 1 shown in FIG. 1 and the ground. The detection circuit 75 comprises the resistor 77 and the capacitor 76 and supplies negative voltage $e_B$ from its terminal 78.

Figure 8:
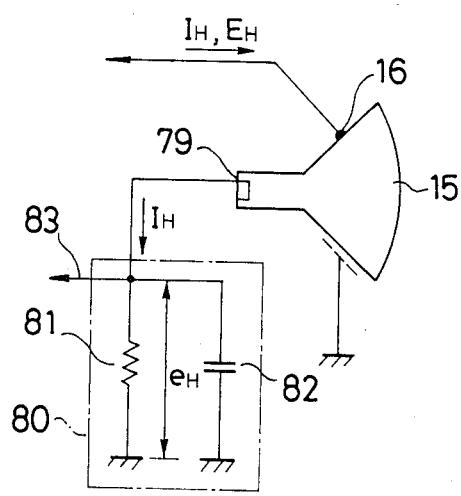
FIG. 8 is an embodiment showing another position where the secondary side current detection circuit is provided.

FIG. 8 is a variation example of the setting position of the secondary side current detection circuit. The secondary side current detection circuit 80 can be provided between the cathode 79 of the cathode-ray tube 15 and the ground. In this case, the detection circuit 80 comprises the resistor 81 and the capacitor 82 and supplies negative voltage $e_H$ from its terminal 83.

The present invention is not limited to the above embodiments and can be modified within the range where such modification does not deviate from the spirit of the present invention. For example, in FIGS. 3 to 6, the high voltage generating apparatus normally operates even when the horizontal deflection coil 6 of horizontal output circuit 1 is replaced with a dummy inductance.

In addition, gate circuits 24, 45 and 69 can be formed with transistors instead of thyristors.

What is claimed is:

1. A high voltage generating apparatus provided between a horizontal output circuit, which operates with a signal from a horizontal drive circuit, and a cathode-ray tube, said high voltage generating apparatus to supply a high voltage to an anode of said cathode-ray tube, said high voltage generating apparatus comprising:
   a flyback transformer having a low voltage coil and a high voltage coil, said flyback transformer boosting a flyback pulse generated in said horizontal output circuit;
   a rectifier circuit rectifying a high voltage produced in said high voltage coil to supply the rectified high voltage to the anode of said cathode-ray tube;
   a primary side current detection circuit detecting a primary current flowing in said low voltage coil;
   a secondary side current detection circuit detecting a high voltage current flowing in said high voltage coil;
   a circuit means which operates when a quantity of current detected by said primary side current detection circuit becomes large in reference to a quantity of current detected by said secondary side current detection circuit; and
   a shut-off means for shutting off a power to be supplied to at least one of said horizontal drive circuit and said horizontal output circuit to stop the operation of said horizontal output circuit when said circuit means operates.

2. A high voltage generating apparatus in accordance with claim 1, wherein said primary side and secondary side current detection circuits respectively comprise a parallel circuit of a capacitor and a resistor.

3. A high voltage generating apparatus in accordance with claim 2, wherein said secondary side current detection circuit has a bias power supply connected in series to said resistor.

4. A high voltage generating apparatus in accordance with claim 1, wherein said circuit means comprises a gate circuit for actuating said means for shutting off the power.

5. A high voltage generating apparatus in accordance with claim 4, wherein said gate circuit includes a thyristor.

6. A high voltage generating apparatus in accordance with claim 1, wherein said circuit means comprises a gate circuit for operating said shut-off means to shut off the power, a comparator circuit for comparing the output of said primary side current detection circuit and the output of said secondary side current detection circuit, and a connection circuit connecting said gate circuit and said comparator circuit.

7. A high voltage generating apparatus in accordance with claim 6, wherein said connection circuit is a Zener diode.

8. A high voltage generating apparatus in accordance with claim 6, wherein said shut-offmeans for shutting off the current is a fuse which will be blown when the quantity of current is excessively large.

9. A high voltage generating apparatus in accordance with claim 8, wherein said fuse is connected in series to the low voltage coil of said flyback transformer.

10. A high voltage generating apparatus in accordance with claim 8, wherein said fuse is connected between said horizontal drive circuit and a power supply for supplying a power to said circuit.

11. A high voltage generating apparatus in accordance with claim 1, wherein an intermediate tap is provided in the low voltage coil of said flyback transformer and the gate circuit is connected to said intermediate tap through a diode.

12. A high voltage generating apparatus for supplying a high voltage to an anode of a cathode-ray tube, said high voltage generating apparatus comprising:
  a flyback transformer having a low voltage coil and a high voltage coil and a rectifier circuit rectifying a high voltage which appears at said high voltage coil and supplying the rectified voltage to the anode of the cathode-ray tube;
  a primary side current detection circuit detecting a primary current flowing in said low voltage coil;
  a secondary side current detection circuit detecting a high voltage current flowing in said high voltage coil;
  a gate circuit which operates when a quantity of current detected by said primary side current detection circuit becomes extremely large when compared to a quantity of current detected by said secondary side current detection circuit; and
  a protection fuse, one end of said protection fuse being connected in series to said low voltage coil, wherein the protection fuse is blown to shut off power to said low voltage coil when said gate circuit operates.

13. A high voltage generating apparatus in accordance with claim 12, wherein said low voltage coil is provided with an intermediate tap, an anode of a thyristor included in the gate circuit being connected to the tap through a diode, and a cathode of said thyristor being connected to another end of said protection fuse to form a closed loop.

14. A high voltage generating apparatus in accordance with claim 13, wherein said low voltage coil, protection fuse and primary side current detection circuit form a series circuit, said secondary side current detection circuit being connected in series to said high voltage coil.

* * * * *